June 1, 1965 J. RABINOW 3,187,306

SYNCHRONIZED IMAGE EXAMINING AND STORAGE DEVICES

Filed Dec. 14, 1962 2 Sheets-Sheet 1

INVENTOR
Jacob Rabinow

BY Joseph A. Genovese & Max L. Libman

ATTORNEYS

INVENTOR
Jacob Rabinow

BY Joseph A. Genovese & Max L. Libman

ATTORNEYS 3,187,306

SYNCHRONIZED IMAGE EXAMINING AND STORAGE DEVICES

Jacob Rabinow, Bethesda, Md., assignor, by mesne assignments, to Control Data Corporation, Minneapolis, Minn., a corporation of Minnesota Filed Dec. 14, 1962, Ser. No. 244,766
18 Claims. (Cl. 340—146.3)

This invention relates to reading machines and particularly to the problems of registering images of unknown characters with the examination device of the reading machine, and to the handling of character-identifying data in coordination therewith.

At this stage in the art a number of optical character reading machines have been constructed and placed in use. Considerable effort is now being directed toward cost-reduction and refinements in technique and equipment, whereby reading machines will be not only more inexpensive but also better suited for specific reading tasks.

Early in the development of reading machines the primary interest was in the machine components such as the examination device (scanner), the recognition circuits, the nature of the temporary storage (usually a shift register in machines using a temporary storage), etc. Ostensibly, there was a tacit assumption that the character images could, by some means, be registered with the examination device to enable the scanner, recognition circuits, etc. to function. It is true that special scanning devices were invented to alleviate character-registration difficulties. However, for the most part character image registration difficulties were solved by oscillating the character image until it is registered with the examination device or by using optical masks (Rabinow Patent No. 2,795,705) or electronic masks (Rabinow Serial No. 115,267) in multiples to correspond to several possible image-positions of each unknown character.

Reading machines are called upon, in the majority of instances, to identify characters which are arranged in lines. Thus, when the first character of a line is registered with the examination device, the other characters of the line are known to be to the right (or left) thereof. This knowledge of the characters being arranged in a line can be exploited in a reading machine as follows.

Rather than resort to complex examination devices which seek the position of every character, optical or electronic mask redundancies, etc., I rely on the knowledge that the characters are in a line, and use a document mover together with a sweeping reflective surface arranged to image successive characters of an entire line on the face of a simple examination device. The preferred arrangement is to sweep the reflective surface across (in optical alignment with) the successive lines of characters as the document is moved. Depending on the speed of the document and the sweep rate, sooner or later each of the characters of a typical line will be imaged in registry on the examination device. Should multiple sets of optical or electronic masks or other known techniques be used in addition to this system, they may supplement the effectiveness thereof. In general, the technique of imaging entire lines of characters in this way is quite similar to that described in the Rabinow, Andrews and Fischer Patent No. 3,142,224, entitled, Reflective Scanner.

Unfortunately, the technique disclosed in the Rabinow, Andrews and Fischer application introduces certain difficulties. During one sweep of the reflective surface (called a mirror henceforth), it happens that a few of the characters of a line may be registered with the examination device and the others will be misregistered so that the reading machine will reject them. During the next sweep perhaps the remaining characters of the line will be recognized. Also, it is possible (and happens) that one or more characters of a line will become imaged in registry with the examination device more than once, i.e., during successive sweeps of the mirror. Thus, the same line of characters may be read twice into the utilization device, e.g., a card or tape punch, magnetic tape, computer, calculator, etc. The more onerous problem seems to be where line fragments are read in successive sweeps because this disturbs the order of the characters. As disclosed in the Rabinow et al. application, these problems can be solved by using an electronic buffer. This leads to one of the focal points of my invention which is cost reduction. A buffer to care for the above problems is expensive, and one of the objectives of my invention is to greatly reduce this and other expenses in the construction of optical character reading machines.

In the various embodiments of my invention I have a storage device, preferably in the form of a magnetic medium, operated synchronously with the mirror which sweeps across the line of characters to form images of them on the examination device of a reading machine. The coupling between the mirror and the buffer can be mechanical or electrical, but in either case the instantaneous position of the buffer corresponds to a predetermined position of the mirror with respect to the document. This inherently solves a number of difficult problems in the following way. By suitable, simple logic circuitry connected with the output of the reading machine and the buffer I record the identity of each character of a line at a position in the buffer which corresponds precisely to the position that each character occupies in a given line. Thus, it does not matter whether a full line is read in one sweep or fragments of a line are read during portions of different sweeps, as each character is recorded in its proper place with respect to the line. Further, it is inconsequential whether the front or rear portion of the line is read first as can happen if the line of characters is rather acutely skewed.

A simple magnetic drum coupled for rotation in synchronism with the mirror forms an excellent, inexpensive storage device. However, other media such as a magnetic tape or belt, disc, etc., could be used. By encoding the outputs of the reading machine before storing them in the buffer, a six bit code is capable of storing all of the characters, including symbols, for almost any character reading task. Even with low packing density, for example 50 or 60 characters per inch, the capacity of a one or two inch diameter drum is in excess of what would ordinarily be required.

Since the rotation of the drum is synchronized with motion of the mirror, each character on the document will have a corresponding space on the drum. If no character appears on the document in a given space, there will be a vacant space on the drum to correspond to this after the line is examined and the characters thereof identified. This leads to certain other features of my invention.

One feature is the capability of recording a signal on a drum to correspond to a rejected character when the reading machine is incapable of identifying a character. Since the Reject mark will be recorded in place of the rejected character when the contents of the drum are read out into the utilization device, the Reject mark on the drum is read in its proper place and order and gated into the utilization device. The Reject may appear as a single signal or code when it is applied to the utilization device.

Another feature of my invention is that during the successive sweeps of a line of characters on a document, a character may be rejected during one sweep and identified as a result of a previous or subsequent sweep. The logic circuits of my invention are so arranged that in such a situation, the Reject signal or code can be discarded and the character-identity gated into the utilization device.

Another feature of my invention, made possible by the synchronization of the magnetic medium with the motion of the mirror, is that a separate channel on the drum can be reserved for "permanent" marks which provide signals for many control functions. For example, the beginning and end of specific fields can be signalled, the beginning of a line, end of a line, edge of document, "read" trigger signals, "comparison" trigger signals, computer instructions, numerical counts, etc. Where the format is known beforehand, the permanent marks can be used to "fill-in-zeros" by gating with the read-out information. "Zero filling" is a computer and electronic calculator requirement to fill block-lengths, provide parity check, etc. as is known in the computer art. Conventional equipment to "fill zeros" is costly. I realize that similar functions and information can be derived from previous reading machines and/or computers, however, the means for achieving corresponding results require expensive, often complex, and almost always complicated circuitry. Not the least of this circuitry are timing circuits, and the functions of some of these are inherent in my system due to the synchronism between the motion of the mirror and the operation of the buffer.

It is not desirable for a reading machine to reject more than a few percent of the characters, although from a practical standpoint the percentage is tolerably increased where print is very poor. However, errors are sometimes considered intolerable, for instance, in rigid accounting. At best, an acceptable error rate is a very low percentage of the identified characters.

Conventional reading machines can be constructed (or adjusted) so that the unknown character must very closely match the character criterion before the machine will provide a character-identity signal (e.g., as in Patent No. 3,104,369 of Rabinow et al.). In this way, errors are minimized, but usually the Reject rate increases. On the other hand, if the acceptable match level is made low, the number of Rejects is reduced but the number of errors is correspondingly increased. A feature of my invention is that the Error-Reject product can be improved by adjusting the machine to favor the Reject rate (require a minimum to low degree of match) which will mean that there are comparatively few rejected characters, and more errors. However, one embodiment of my invention has means to verify all of the identified characters, thereby supplementing the error-detection ability of the reading machine and making possible the more favorable Error-Reject product.

Although code-verification is an old technique, the means that I use to verify the identified characters distinguishes from previous means in at least two ways. My verification feature is simple and inexpensive, and it relies on multiple examinations (by the reading machine) of the same character and the comparison of the character-identity codes (or other signals) for each independent examination.

Other objects and features of importance will become apparent in following the description of the illustrated forms of the invention which are given by way of example only.

FIGURE 3 shows means to verify the identified characters before they are applied to the utilization device.

*Preface*

Figure 1:
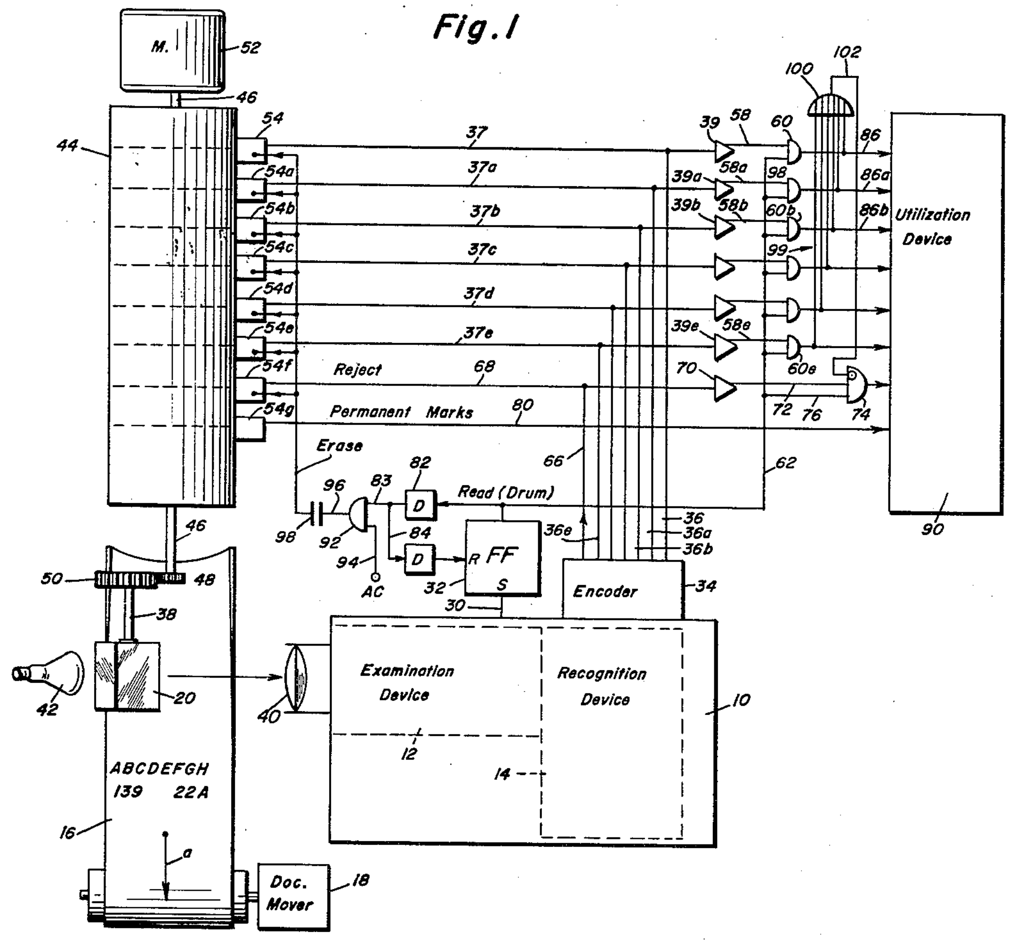
FIGURE 1 is a partly perspective and partly schematic view showing one embodiment of my synchronized image forming device and buffer together with logic circuits interconnecting the same with a reading machine and a utilization device.

FIGURE 1 shows a conventional reading machine 10 provided with an examination device 12, a recognition device 14, and an encoder 34 to provide codes corresponding to the identified characters. Other components essential to the reading machine are not shown since the details of the machine form no part of my invention. It is sufficient to understand that as images of unknown characters are formed on examination device 12 by lens system 40, the recognition device actuates the encoder to provide character-identity codes.

Document 16 has characters arranged in transverse lines (e.g., the line ABCDEFGH), as on pages, sales slips, credit cards, tags, etc. A conventional document mover 18 moves the document in the direction of arrow *a* (FIGURES 1 and 2), i.e., transverse of the lines of characters. The moving mode can be step-by-step, continuous or with non-uniform velocity as by accelerating between lines. To simplify the description, it is assumed that the document is moved continuously.

FIGURE 1 shows a mirror 20 mounted above a transversely curved part of document 16, and in optical alignment with the document and examination device 12 by way of lens 40. The mirror is rotated so that successive sweeps of its reflective surfaces image successive transverse lines in its field of view (document 16) onto examination device 12. Thus, when a line of characters is imaged in registry on device 12, the characters are identified whereby encoder provides character identity codes on lines 36, **36*a* . . . 36*e***.

Figure 2:
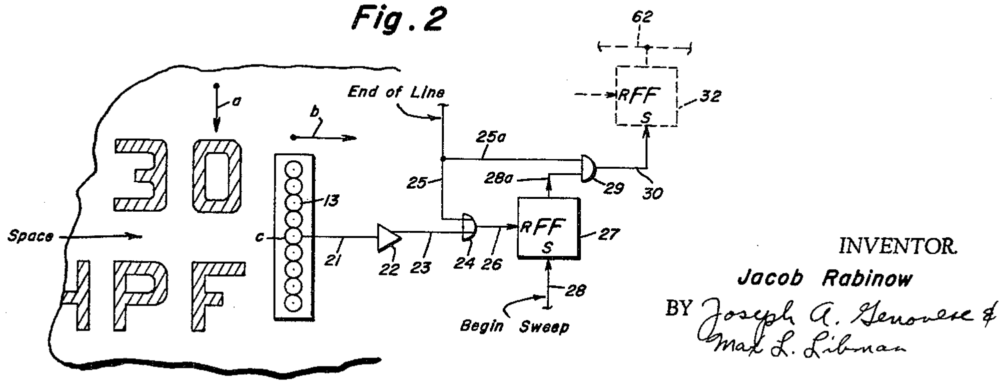
FIGURE 2 is an enlarged fragmentary view showing the document of FIGURE 1 being moved by the paper mover, and the motion of an image of two characters in adjacent lines with respect to a stationary examination device in a reading machine, where the examination device is provided with means to yield a "read from drum" signal when the space between adjacent lines on the document is detected.

The preceding relates to conventional reading machine operation, except for mirror 20 which can be the same as the mirrors disclosed in Patent No. 3,104,224. For the purpose of explaining my invention I have one other feature, and that is a signal indicating that the space between adjacent lines of characters on document 16 is approximately registered with examination device 12. Therefore, FIGURE 2 shows a vertical row 13 of photocells of a height greater than the characters of a line. The photocells can be considered as the photosensitive portion of device 12 or a part thereof or as a separate prescanner, with identical results. As sweeping mirror 20 forms images of successive characters of a line on device 12, 13, the center photocell *c* (or a plurality of cells whose outputs are Or gated, not shown) seeks the clear space between adjacent character lines in the following way. Photocell *c* has output line 21 connected to amplifier 22 whose output line 23 is Or gated at 24 with a line 25 which conducts a signal indicating the "end of line," i.e., the end of the arc of the mirror 20 in sweeping across document 16. The "end of line" signal can be obtained by reading a permanent mark from drum 44 as described later, or in other ways. The output line 26 of gate 24 is connected with the reset terminal of flip-flop 27. The flip-flop is set by a "beginning of sweep" signal on line 28 which can be obtained from drum 44 like the "end of line" signal on line 25 or in other ways. Thus, flip-flop 27 is set at the beginning of each sweep of a surface of the mirror and reset at the effective end of the sweep. If photocell *c* detects a portion of a character during the sweep, a reset signal occurs on lines 21, 23, 26 to reset the flip-flop before the end of the sweep. On the other hand, if lines 21, 23, 26 conduct no signal during a mirror-surface sweep, the flip-flop 27 will be set at the end of the sweep providing a coincidence signal on line 28a from the flip-flop at the time of the "end of line" signal on line 25a. Lines 25a and 28a are And gated at 29, and the output of the And gate on line 30 sets flip-flop 32. (Flip-flop 32 is a control member in my system and will be referred to several times subsequently.) It is understood that FIGURE 2 shows only one of numerous ways to detect the clear space between adjacent lines of print, another being to use the outputs of the recognition device 14 or encoder 34 to provide the signal on 23 instead of using scanner or prescanner information as shown in FIGURE 2.

*The invention*

More specific reference is now made to my invention and its cooperation with a conventional reading machine. Mirror 20 has four reflective sides and is attached to shaft 38 which is supported by bearings (not shown) above the curved surface of document 16. The optical system represented by lens 40 (which may be a part of the reading machine) is in optical alignment with the mirror and the mirror, in turn, is in optical alignment with a portion of document 16 illuminated by light source 42. Magnetic drum 44 which constitutes a part of my storage device, has shaft 46 provided with a pinion 48 enmeshed with gear 50 fixed to mirror shaft 38. Shaft 46 is rotated by any conventional means represented by motor 52. With a four to one ratio between gears 48 and 50, the magnetic drum 44 rotates four times for every complete rotation of mirror 20. Thus, one revolution of the drum corresponds to each sweep of one of the surfaces of mirror 20 across a line of characters on a document.

In addition to drum 44, my buffer has a set of magnetic heads which are of the conventional, read-write type. Heads 54–54e inclusive are for recording and reading character codes while heads 54f and 54g service separate channels on the drum for Reject marks and permanent marks or codes respectively, such as for indicating field marks, end of line, etc., as discussed before. If the permanent marks are recorded as codes in the permanent mark channel, the various marks conducted on line 80 from head 54g will be decoded when used. The embodiment of FIGURE 3 which has the additional facility of information code-verification, has an additional channel on the drum and head 54h to record Error signals.

The logic circuitry of my invention is sufficiently simple to be described in connection with the operation. Thus, starting with a clear drum (except for any permanent marks) assume the most complex situation where a few characters of a line are identified by machine 10 during one sweep of one surface of member 20, and during the next sweep the remaining characters of the line are identified. For example, let us assume that the characters A, B, C and D are identified by machine 10 and codes representing these characters are conducted on lines 36–36e to heads 54–54e by means of lines 37–37e. The code signals on lines 37–37e are also impressed on the amplifiers 39–39e, and are conducted on lines 58–58e to the And gates 60–60e as one input of each. The other input of each gate is the "read from drum" signal conducted on line 62, the latter being attached to the output terminal of flip-flop 32. Since we described before that the flip-flop 32 is not set until the clear space between adjacent lines of characters is detected, gates 60–60e are not satisfied, whereby the only possible path for codes representing the letters A–D inclusive is for them to be recorded on the drum. Since the drum moves synchronously with the mirror 20, the four first characters of the line are recorded in positions on drum 44 which correspond to their proper positions in the line of characters being read. The remaining characters E, F, G and H of the line will not be identified and nothing will be recorded in the information channels of the drum in the places for these characters.

Now consider a subsequent sweep of the line of characters where the remaining characters E, F, G, H are identified. The previously identified characters A, B, C, D (in this subsequent sweep) probably will not be identified, but if they are, it will be with the inconsequential result that they will simply be re-recorded in their proper place on the drum. The important thing is that characters D, E, F, G, and H will be recorded on the drum in their proper places and in a sequential manner by the codes being conducted over lines 36–36e, 37–37e to the information heads 54–54e.

As the next step, assume that the subsequent sweep of the line of characters presents images to examination device 12, 13, in the manner described before, to cause flip-flop 32 to be set. The flip-flop remains set for a time corresponding to that required for the drum to make two complete revolutions, although separate erase heads (instead of using heads 54–54f to erase) would reduce this requirement to a single revolution. My reason for the two revolutions is that one is used for read-out of the drum and another is used for erasing the drum to prepare it for the next line of characters. Correct timing can be assured by a simple feedback delay circuit for resetting flip-flop 32 and/or gating permanent mark signals from head 54g and line 80 with the flip-flop reset, delay circuit. The delay circuit consists of a conventional delay line 82 interposed in the "read from drum" signal line 62 and a delay line 84 connected to the output thereof and to the reset terminal of the flip-flop. The double delay is used in this way: during the period of delay 82 drum 44 makes a single revolution, while the signal on line 62 exists, to enable gates 60–60e to pass information from the drum via lines 37–37e, the amplifiers therein, lines 58–58e and the gate output lines 86–86e, to a conventional utilization device 90. When delay 82 passes the signal from line 62, line 83 conducts the signal to an And gate 92 whose other input is an A.C. source 94. The output line 96 or gate 92 conducts the A.C. erase signal through a capacitor 98 (to filter the D.C. level) to the heads 54–54f (permanent marks remain) to erase the drum. When the drum has completed the erase revolution, delay line 84 will have conducted the signal from line 83 to reset flip-flop 32 and prepare the system for the next line of characters.

The above deals with the complicated situation where a few characters of a line are identified in one sweep of a surface of mirror 20, and others are read as a result of a subsequent sweep or sweeps. If the entire line of characters are identified in a single sweep and the subsequent sweep is also a read-record sweep ("read now" signal does not occur), the characters of the line will simply be re-recorded on the drum to be read out when a "read" signal enanates from flip-flop 32.

Consider, now, the handling of a Reject, i.e., where the reading machine endeavors to identify a character and fails to do so, at least with a preselected certainty. In such a case a single Reject signal or code is provided on line 66 by the machine, e.g., from the recognition device 14 and/or encoder 34. The Reject signal can easily be recorded by heads 54–54e in the information channels of drum 44 to occupy the place of the rejected character, but I prefer to record the Reject signal in a separate channel on drum 44 via lines 66, 68 and head 54f. This allows me to more easily make various logical selections (discussed later) and more easily adapt my invention to different kinds of utilization devices 90.

When a Reject occurs during the sweep of a line of characters a Reject signal will be recorded in the Reject channel of the drum by head 54f, and will be impressed on amplifier 70 (FIGURE 1) to be amplified and conducted on line 72 as one input of inhibit And gate 74. The inhibit feature of gate 74 is described later. The gate 74 has an And input line 76 connected to the "read from drum" signal line 62 which is the output line of flip-flop 32. Since flip-flop 32 is not now set, gate 74 cannot pass the Reject signal to the utilization device. Instead, it is only recorded on drum 44. The various uses of the Reject signal are described below.

Assume that a line of characters has been read by machine 10 and recorded on drum 44, but during one of the read-record sweeps, one of the characters was identified during one sweep and rejected during another. By recording the Reject in a separate channel of the drum (instead of in the information channels), I have the choice of (*a*) noting the rejection (in the utilization device 90 or otherwise) during drum read-out, or (*b*) ignoring the Reject and passing the character-identity code to device 90. I have shown circuit connections for (*b*) because the circuit connections for (*a*) are identical except lines 99, gate 100 and line 102 will be omitted.

During read-out of drum 44 (when "read from drum" signal exists on lines 62, 76), gates 60–60*e* are satisfied passing character codes over lines 86–86*e* to utilization device 90. Each time that a code is detected on any of lines 86–86*e* by Or gate 100 whose inputs are from lines 86–86*e* via lines 99, an inhibit signal occurs on the gate output line 102 to inhibit the Reject gate 74. Thus, if a Reject is read from drum 44 at the same time as a character code, the character code passes to device 90 and the signal on line 102 inhibits the Reject at gate 74. If it is desired to pass both the character and Reject to device 90, lines 99, gate 100 and line 102 are omitted. If it is desired to pass only the Reject signal to device 90 and inhibit the character code, inhibit gates (inhibited by a Reject signal read from drum 44) are interposed in lines 86–86*e*. With the illustrated circuit, if no character code coincides with a Reject read from the drum, i.e., a situation where machine 10 simply rejected a character, the Reject passes gate 74 to device 90.

Figures 3, 4, 5:
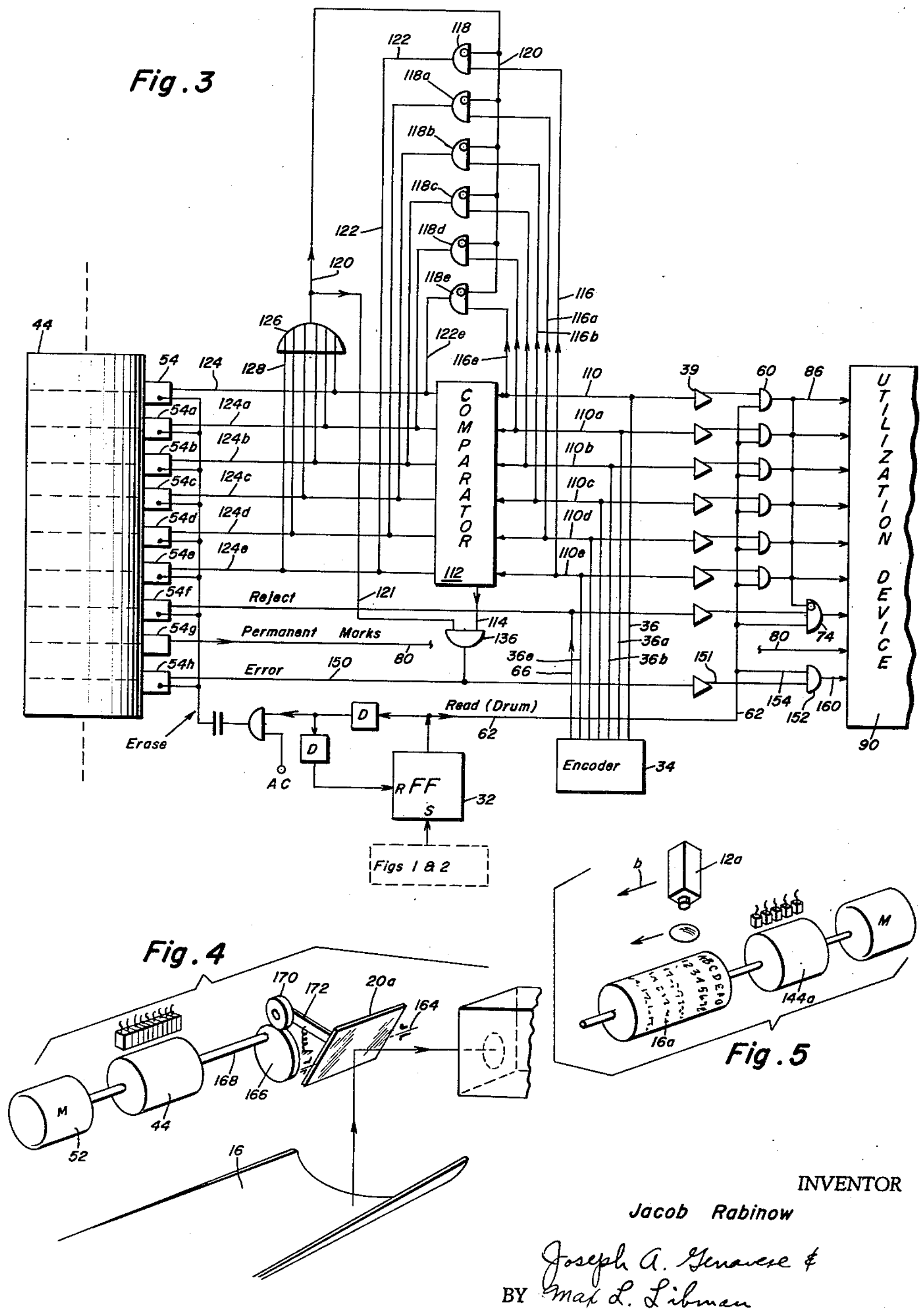
FIGURE 3 is a fragmentary diagrammatic view to be considered in conjunction with FIGURE 1, the embodiment of FIGURE 3 being substantially the same as in FIGURE 1 except
FIGURE 4 is a fragmentary perspective view showing a modification where the mirror is oscillated synchronously with the rotation of the magnetic drum instead of having the mirror rotate as in FIGURE 1.
FIGURE 5 is a schematic view showing another modification.

Referring now to FIGURE 3, the duplicated parts of FIGURE 1 are identified by the same reference characters in both views. The omitted parts in FIGURE 3 are understood to be omitted in the interest of clarity. The major distinction between the embodiments of FIGURES 1 and 3 is that FIGURE 3 has means to compare each incoming code from encoder 34 with character codes (if any) that have been previously recorded on drum 44 as the result of a previous reading machine operation. If the codes match during the write mode, nothing happens. However, if the codes fail to match, an Error signal is recorded by head 54*h* in a separate channel on the drum to be read out during the time of the "read from drum" signal. The Error signal can be used in numerous ways already known in the art, such as generating an Error signal to be applied to the utilization device (shown) generating an Ignore symbol when the utilization device is a computer or computer-like device, etc.

The verification feature mentioned above and described in detail below, functions by character-identity-code comparison. As shown in FIGURE 3 it requires very little equipment which imposes no limitation on the kind of code which is used. If one were willing to use a conventional self-checking code such as a two-out-of-five code, the verification equipment could be eliminated without losing the verification effect. For example, in a two-out-of-five code, if two different codes are recorded on top of each other (during separate examinations of the same character on the document), the composite recording will produce a code that identifies no character and this can be recognized as an Error during drum-read-out by a conventional code-error detector (not shown). However, to avoid reliance on any particular code, I have shown a more versatile verification means in FIGURE 3.

Referring more specifically to FIGURE 3, the encoder output lines 36–36*e* are connected to data lines 110–110*e* which form inputs to a comparator 112. The comparator can be an analog or a digital device, and it has the capability of providing an Error signal on line 114 when comparison fails. Lines 116–116*e* are connected to lines 110–110*e* and they form individual inputs to a group of inhibit gates 118–118*e* whose inhibit input signals are tapped from bus 120. The output lines 122–122*e* of gates 118–118*e* are connected with lines 124–124*e* whose opposite ends connect respectively to comparator 112 and read-write heads 54–54*e*. The inhibit signal for gates 118–118*e* on bus 120 is obtained from Or gate 126 whose input lines 128 are connected with individual lines 124–124*e*.

The operation of this form of my invention is identical to that of FIGURE 1 except for the verification feature. In operation, assume that the drum is clear, except for the permanent marks recorded thereon. To simplify description, assume that all characters are read correctly during the first imaging sweep of a line by mirror 20. The codes are conducted on lines 36–36*e*, over lines 110–110*e* to the gates 60 which the codes cannot pass because there is no enabling ("read from drum") signal on line 62. The character codes are also impressed on one set of input terminals of comparator 112, and since there is nothing on the drum with which to compare the codes, each comparison will yield an error signal on line 114. However, this signal does not reach the drum because it cannot pass gate 136 for failure of coincidence at gate 136 which has input lines 114 and 121, the latter of which is connected with the previously mentioned inhibit bus 120. At the same time that the codes (from the encoder) are impressed on comparator 112, they are conducted over lines 116–116*e* and lines 122–122*e* which form a parallel path with the comparator. These lines are connected with lines 124–124*e* which are connected with the character read-write heads 54–54*e* so that the character is recorded in the information channels of drum 44 by heads 54–54*e*. Although the character data on lines 124–124*e* will trigger the signal on bus 120 and inhibit the gates 118–118*e*, the timing is such that the character data will have already passed the Or gate input lines 128, and if timing is considered to be too close, a delay can be interposed in line 120 between the gate 126 and its juncture with line 121. A further alternative would be to use a self-clocking pulse system which uses the leading edge of each digital information pulse to develop its own clock pulse. However, since the circuitry for this is slightly complex, not essential for my invention, and is not new, I have not shown the details thereof.

Now consider the situation where the drum has been loaded with character codes corresponding to all characters of a line on document 16 (FIGURE 1). Assume that during a subsequent image forming process by a sweep of a surface of mirror 20, one of the characters is read as a different character, i.e., an Error is made by the reading machine. It is important to distinguish between an Error and a Reject, the latter being where the machine cannot ascertain the identity of the character, and the former being where the machine decides that the character is of one identity during the first sweep and a different identity during the second sweep.

Thus, with the drum loaded and flip-flop 32 not yet set (for drum readout) assume that the mirror starts its sweep. Since drum 44 operates synchronously therewith, the first character is read from drum 44 by means of heads 54–54*e* and the character code is applied to comparator 112. Also, gates 118–118*e* are inhibited because gate 126 detects the presence of information being conducted from the drum over lines 128 and provides an inhibit signal on bus 120. The signal on bus 120 is also provided on gate 136 via line 121 so that now an error signal on line 114 can pass gate 136 to the error line 150. Accordingly, we have the facility for comparison at 112, the comparison medium being read from the drum, and an input code on lines 36–36*e* and 110–110*e* which is applied to the comparator 112 but cannot pass gates 118–118*e*. If the comparison checks, thereby verifying the two codes for the same character, a signal is provided on line 121 satisfying one input to gate 136, but the comparator provides no output on line 114 and no Error signal is recorded by head 54$h$ on drum 44. If the comparison fails, i.e., there is no verification; there will be a signal on line 114 and another signal on line 121, thereby satisfying gate 136 and yielding an Error signal which is conducted on line 150 to the head 54$h$ which records an Error mark in a separate channel of the drum.

At the time of read-out, a signal occurs on line 62 from flip-flop 32 in the manner exactly the same as described in connection with FIGURE 1. In addition to all of the other functions of the signal 62 previously assigned thereto, the "read from drum" signal on line 62 is conducted to an And gate 152 via line 154 which is attached to line 62. The other input to gate 152 is line 151 which is the amplified output from the drum Error channel by way of head 54$h$ and line 150 to which the amplifier and line 151 is connected. Thus, the Error or Ignore signal represented as the output of gate 152 on line 160 is applied to the utilization device or otherwise used in a suitable manner depending on the choice of the designer, especially as dictated by the type of utilization device 90.

FIGURE 4 shows a modification using an oscillating mirror 20$a$ instead of a rotating mirror 20. The oscillating mirror 20$a$ is mounted for oscillation about a pivot axis 164 and is driven by cam 166 attached to the common shaft 168 of drum 44 and motor 52. Cam follower 170 is mounted on a rocker arm 172 in such a manner as to engage the surface of the cam, and the rocker arm is suitably secured to the mirror to cause it to oscillate.

This form of my invention must take into account the fact that the mirror sweeps back and forth instead of having one reflective surface follow another as in FIGURE 1. The simplest way to account for this difference is to use only half the duty cycle of the mirror. A "fast return" cam can make the useful portion of the sweep cycle large relative to the return portion of the cycle. It is also possible to record during the forward and back swing of the mirror, and to commutate the data by relying on two sets of heads spaced apart 180° around the drum, instead of a single set of heads. Also, the drum could be oscillated (instead of rotated) in synchronism with the mirror so that there would be no data inversion problem.

FIGURE 5 shows my invention embodied in a system where the document 16$a$ is on a drum 18$a$ used as a document mover with the examination device 12$a$ constrained to move in the direction of the arrow $b$ (parallel to the axis of drum 16$a$ and rectilinearly adjacent to its surface). The magnetic drum 44$a$ is driven in synchronism with drum 16$a$, either at the same speed or at a predetermined speed ratio therewith. It is also possible to retain the examination device 12$a$ (or 12 of FIGURE 1) stationary and impart two components of motion to the document. One component would correspond to arrows $a$ and $b$ of FIGURES 1 and 5, and the other would correspond to the sweep of mirror 20 (FIGURE 1) or the rotation of drum 16$a$ (FIGURE 5).

Numerous other variations and modifications can be made without departing from the protection of the following claims.

I claim:

1. In a reading machine for a plurality of characters wherein the characters are arranged in a group, character recognition means, means for examining each character to provide outputs to said recognition means by which said recognition means provide character identity representations; means for presenting the group of characters in turn a plurality of times to said examining means, storage means synchronized with said presenting means, and means to insert said representations of the characters in said storage means in physical locations of said storage means which correspond to the positions that the characters which they represent occupy in said group regardless of the order of character identification and regardless of the particular presentation of said group to said examining means which enabled said recognition means to provide the respective identity representations.

2. A synchronized image forming device and storage device for a character reading machine having a character examination means and recognition means providing output signals corresponding to the identified characters, comprising a light reflective member mounted in optical alignment with said examination device and an area having a plurality of characters, means to sweep said reflective member across said area to form images of the characters successively on said examination means to enable said recognition means to identify the successive characters and provide signals corresponding to the identified characters, a storage device driven synchronously with said reflective member so that the instantaneous position of said storage device corresponds to the position of said reflective member, and means responsive to said signals for loading said storage device with representations of the identified characters and in a spatial position of said storage device which corresponds to the positions of the identified characters of said area.

3. The subject matter of claim 2 wherein said reflective member is swept across said area and characters more than once, and said loading means inserting the representations in their said spatial position regardless of the sweep during which the characters are identified.

4. The subject matter of claim 2 wherein there are means providing a reject signal when the reading machine fails to identify a character of said plurality, and means responsive to said reject signal for noting the position of the rejected-character in said storage device thereby distinguishing in the output of said storage device between a rejected character and a space between characters on said area.

5. The subject matter of claim 4 wherein said reflective member sweeps across said plurality of characters more than once, and means to record the identity of said rejected character in said noted position when the rejected character is identified as a result of a subsequent sweep.

6. The subject matter of claim 5 wherein said storage device includes a magnetic storage medium, and said character representations are codes which are stored therein.

7. The subject matter of claim 6 and control means recorded on said magnetic medium which are spatially related to predetermined angular positions of said reflective member to provide various control signals such as the "beginning" and "end" of effective sweep of the reflective member.

8. In a character reading machine system for characters arranged in lines on a document which is constrained to move in a path approximately normal to the lines, and the reading machine has an examination device and recognition means which provide that identify the read characters, the improvement comprising: movable reflective means in optical alignment with said examination device and a line of characters, means to sweep said reflective means relative to said lines more than once in a manner to form, in turn, images of successive characters of the line on said examination device, a storage device operated in synchronism with the sweep of said reflective means so that the instantaneous positions of said storage device correspond to the positions of said reflective means, an encoder for said character-identify signals, means to load the encoded signals into said storage device in the time order of recognition but in the spatial order corresponding to the positions of the characters in said line so that any characters which are unrecognized during an earlier sweep of said reflective means but recognized in a later sweep are inserted in said storage device in their proper spatial places as determined by their occurrence in said line.

9. The subject matter of claim 8 wherein said storage device includes a magnetic member which is rotated by said reflective member sweeping means.

10. The subject matter of claim 8 and means associated with said encoded signal loading means for comparing the incoming code for a subsequent sweep with the stored code resulting from character identities as a result of an earlier sweep to verify recognition of each character during the several sweeps of the same line of characters.

11. The subject matter of claim 8 and verifying means to verify the identities of each character by comparing the character codes defining the characters at sequential positions in the line as a result of more then one sweep of the line.

12. The subject matter of claim 11 and means to provide an error signal when the codes for a character at a given position fail vertification by said verifying means.

13. In a reading machine having a character examination device and a recognition device providing character-identity signals when the characters are identified, the improvement comprising means to form successive images of a line of characters more than once on said examination device, and a buffer for the character-identity signals, means coupling said image forming means and said buffer for synchronous operation thereby relating the positions of said image forming means to specific positions of said buffer and automatically preserving the order of occurrence of characters of said line in said buffer regardless of the order of character identification by said recognition device.

14. The subject matter of claim 13 wherein the reading machine provides a reject signal when a character of the line is not identified, means associated with said buffer to record the reject signal in said buffer at a place corresponding to the rejected character, and logic means to select the character identity signal from said buffer when the buffer has stored both a reject signal and a character-identity signal in a given character position.

15. The subject matter of claim 14 and means to verify the characters identified as a result of plural examinations and recognitions of the same line of characters.

16. In a character reading machine system for lines of characters on a document where the document is moved in a direction transverse to the lines, and there are clear spaces between adjacent lines, and the reading machine has an examination device on which the images of the characters must be registered for the machine to identify the characters: the improvement comprising image forming means in optical alignment with the document and examination device, means to move said image forming means with respect to said document in a manner to optically sweep across the document in a direction approximately parallel to the lines of characters, the sweep rate being high with respect to document motion so that a single line of characters is imaged more than once before it passes said image forming means and also so that at least fragments of the line are imaged in registry on said examination device during said sweeps, a buffer, means to actuate said buffer in sync with said image forming means so that instantaneous positions of said buffer correspond to instantaneous positions of said image forming means for each sweep thereof and the buffer and image forming means are slaved with each other, means responsive to the output signals of the reading machine for storing character-identity representations for more than one character in positions of said buffer which correspond to the positions of the characters in a line due to the synchronism of said image forming means and said buffer regardless of the sweep during which the characters of said line become registered with said examination device.

17. In a character reading machine system for lines of characters on a document where the document is moved in a direction transverse to the lines, and there are clear spaces between adjacent lines, and the reading machine has an examination device on which the images of the characters must be registered for the machine to identify the characters: the improvement comprising image forming means in optical alignment with the document and examination device, means to move said image forming means with respect to said document in a manner to optically sweep across the document in a direction approximately parallel to the lines of characters, the sweep rate being high with respect to document motion so that a single line of characters is imaged more than once before it passes said image forming means and also so that least fragments of the line are imaged in registry on said examination device during said sweeps, a buffer, means to acuate said buffer in sync with said image forming means so that instantaneous positions of said buffer correspond to instantaneous positions of said image forming means for each sweep thereof and the buffer and image forming means are slaved with each other, means responsive to the output signals of the reading machine for storing character-identity representations for a plurality of characters in positions of said buffer which correspond to the positions of the characters in a line due to the synchronism of said image forming means and said buffer regardless of the sweep during which the characters of said line become registered with said examination device, and means responsive to the detection of the clear space between lines of characters for providing a signal to read the character representations from said buffer.

18. The subject matter of claim 16 and means for verifying reading machine output signals for a given sweep of said image forming means with said stored representations resulting from a previous sweep operation, and means to provide an error signal for failure of verification.

References Cited by the Examiner

UNITED STATES PATENTS

| | | | |
|---|---|---|---|
| 2,922,894 | 1/60 | Kerr | 340—146.3 |
| 3,061,731 | 10/62 | Thier | 340—146.3 |
| 3,068,361 | 12/62 | Lannan | 340—146.3 |
| 3,102,995 | 9/63 | Abbott | 340—146.3 |
| 3,105,956 | 10/63 | Greanias | 340—146.3 |

MALCOLM A. MORRISON, *Primary Examiner.*